May 16, 1961  W. G. DE PEW  2,983,945
WIPER BLADE ASSEMBLY
Filed March 12, 1958
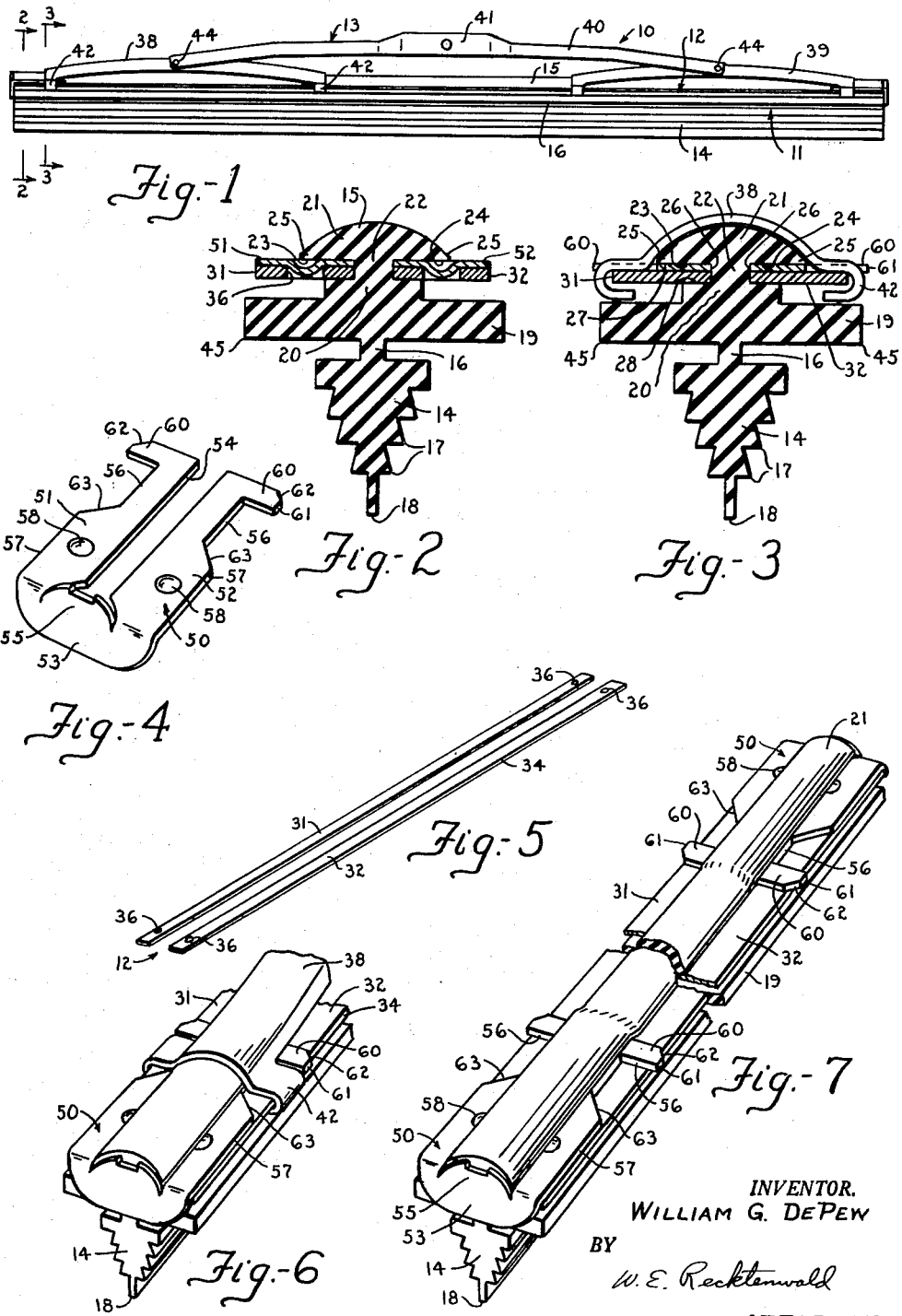
INVENTOR.
WILLIAM G. DE PEW
BY
W. E. Recktenwald
ATTORNEYS

United States Patent Office 2,983,945
Patented May 16, 1961

2,983,945

WIPER BLADE ASSEMBLY

William G. De Pew, Gary, Ind., assignor to The Anderson Company, a corporation of Indiana Filed Mar. 12, 1958, Ser. No. 721,045

6 Claims. (Cl. 15—250.42)

This invention relates generally to windshield or window wiper apparatus and more particularly to an improved wiper for wiping the surface of a curved windshield.

The majority of wiper blade apparatus used today on both flat and curved surfaces of windshields comprises a flexible backed blade and a pressure-distributing device operatively connected to the blade in such a manner as to substantially distribute the pressure from the windshield wiper arm over the surface of the blade, such as is covered by U.S. Patent 2,596,063 issued on May 6, 1952, to J. W. Anderson. Use of the basically new type of blade covered by said patent has produced profound results in the efficient and effective cleaning of windshields that has contributed in large measure to the improved safety of the many different types of motor vehicles in use today.

Many variations in the broad teaching of the patent have resulted in a large market for the blade and for refill elements for the blade. The refill elements preferably comprise a squeegee or rubber wiping element together with a flexible support means assembled therewith separate from a pressure-distributing superstructure. One variation of the above-referred-to basic invention provides for independent support means on the opposite sides of the rubber squeegee element that are not connected together and are not connected to the squeegee element. To maintain the independent support means assembled with the squeegee element to form the refill element has presented new problems to the manufacturers of wiping blades. It is, therefore, a principal object of this invention to overcome the above-noted problem and to provide an improved windshield wiper blade assembly having a readily replaceable flexible backed squeegee or wiping element.

It is another object of this invention to provide an improved wiping element having improved means for retaining the flexible support means assembled with the squeegee or wiping element.

It is still another object of this invention to provide an improved wiper blade structure wherein the secondary yokes of the pressure-distributing device have claw means coacting in part with the means for retaining the support means in grooves in the resilient wiper element of the blade for holding the pressure-distributing device connected to the blade.

Another significant object of this invention is to provide an improved means associated with the ends of the rubber wiping element and with the flexible support means for holding said element and said support means assembled as a unit.

A still further object of this invention is to provide an improved wiper blade assembly wherein the metal parts associated with the resilient wiper element are positioned in both a sidewise and endwise direction such that in normal operation no metal parts are exposed to scratch or mar a windshield.

And still an additional object of this invention is to provide an improved wiper blade assembly wherein the resiliency of the material forming the wiper element of the blade serves to retain the flexible support means in seated relation with the keeper means on the ends of the blade as well as with the claw means on the pressure-distributing device.

A further object of this invention is to provide an improved method of assembling a wiper blade unit that is more efficient and requires less skilled labor than most present methods.

Other objects and advantages of the invention will become evident when the description herein set forth is considered in conjunction with the drawings annexed hereto.

Figure 1 is a side elevational view of a windshield wiper blade assembly embodying the features of the present invention;

Figure 2 is a cross-sectional view of the blade taken along the line 2—2 of Figure 1;

Figure 3 is a cross-sectional view taken along the line 3—3 of Figure 1;

Figure 4 is a perspective view of the clip or keeper means forming an important part of the present invention;

Figure 5 is a perspective view of the flexible supports or backing means of the blade illustrated in Figure 1;

Figure 6 is an enlarged perspective view of one end portion of the wiper blade of Figure 1; and Figure 7 is an enlarged perspective view of a complete replacement type wiping element of the present invention.

The windshield wiper blade assembly 10, as exemplified in the drawings, comprises a resilient wiper element 11, an elongate uniformly flexible support or flexor means 12 detachably secured thereto, and a pressure-distributing device 13. The resilient wiper element 11 is composed of a wiper head portion 14 and an attaching or back portion 15 which are joined together by a relatively thin intermediate hinge 16 so that the wiping head portion may move laterally with respect to the back portion when the blade is moved back and forth across the windshield. The head portion 14 has several outwardly extending edge portions 17 tapered gradually downwardly to a surface-contacting wiping edge 18 adapted to contact a windshield for cleaning the surface thereof.

The back portion 15 of the wiper element is comprised of a lower section 19 which is relatively thick in the vertical direction and is joined to a web 20 longitudinally of the element. An upper section 21 of the back 15 is joined to an undercut portion 22 of the web 20 so as to form a pair of matching grooves 23, 24 in the opposite sides thereof extending the full length of said back portion. The upper section 21 of the back portion 15 has outer edge portions 25 overhanging the web 20 in the lateral direction. Each of the grooves 23, 24 has a base wall 26 spaced an equal amount on the opposite sides of the longitudinal center line of the blade. Each base wall 26 is bounded by the side walls 27, 28, with wall 27 extending a greater distance outwardly from the base wall 26 than the wall 28 for a reason more fully described hereinafter.

The elongate uniformly flexible support or flexor means 12 is best shown in Figure 5 and is comprised of two elongate rectangularly shaped flexible members 31, 32 which are adapted to be resilient or flexible in a single plane and to be substantially inflexible in a plane substantially perpendicular thereto. The flexible members 31, 32 are adapted to be nested within the grooves 23, 24, respectively, formed in the sides of the back portion 15 of the wiper blade so that the outer edges 34 of the members are positioned beyond the edge portions 25 of the upper section 21 of the back portion but do not extend all the way to the outer edge of the lower section 19. Symmetrically disposed in the flat end portion of each support member 31 or 32 is an aperture 36.

Loosely connected with the support members 31, 32 on the back portion 15 of the wiper element 11 is the pressure-distributing device 13 which, in the illustrated form, is adapted to engage the wiper blade in a manner to distribute any pressure or force upon the pressure-distributing device 13 along the full length of the blade. The pressure-distributing device may be constructed in various ways but as herein illustrated preferably includes a pair of corresponding secondary yokes 38 and 39, and a primary bridge 40. A connector 41 of any suitable form may be fixedly carried at about the midpoint of the bridge 40 for detachably connecting the wiper blade assembly to a spring-loaded wiper arm (not shown).

The ends of the secondary yokes 38, 39 are provided with claws 42 which are movably connected to the blade at longitudinally spaced points or locations. In the illustrated form the ends 44 of the primary bridge 40 are pivotally connected to intermediate portions of the secondary yokes 38, 39 in a well-known manner. The claws 42 on the yokes 38, 39, as viewed in Figures 3 and 6, are adapted to slidingly but embracingly engage the outer edges 34 of the flexible members 31, 32 at longitudinally spaced points.

The lower section 19 of the back portion 15 of the wiper blade has edge portions adapted to extend laterally beyond the outer extremities of the claws 42 on the secondary yokes 38, 39 and beyond the outer exposed edges 34 of the flexible members 31, 32 so that as the wiper blade is moved back and forth across a windshield the possibility of any metal parts of the wiper blade assembly coming in contact with the surface of the windshield is substantially reduced. The lower section 19 of the back portion 15 further acts as a wiping edge if the blade should roll over on its side to such an extent that one of the edges 45 is brought into contact with the surface of the windshield. This adds an additional wiping element to the wiping blade.

The flexor means or support members 31, 32 are held assembled in the grooves 23, 24 by a pair of keeper means 50 each one of which straddles the opposite end portions of the rubber wiping element. The keeper means 50, as best shown in Figure 4, is composed of a U-shaped body portion having legs 51, 52 joined together by a bridge 53 so as to define a slot 54 down the middle of the keeper 50. The bridge 53 is bent or shaped into a plane lying substantially perpendicular to the plane of the legs 51, 52 and includes a portion 55 struck from the legs 51, 52.

The legs 51, 52 each have a notch 56 cut into the outer side edges 57 thereof in oppositely disposed aligned relationship with each other and spaced longitudinally from the outer extremities of the legs 51, 52. A pair of dimples or detent portions 58 are pressed into the plane portions of the legs 51, 52 so as to project downwardly below the plane of the legs 51, 52. It is to be understood that the detents could be pressed upwardly, could be in the form of extra discs welded to the legs or could assume any other reasonable form that serves as a protruding portion relative to the plane of the legs. The detent portions 58 are spaced from the bridge 53 an amount substantially equal to the distance from the end of the support members 31, 32 to the apertures 36 formed therein.

The outer end portions or lugs 60 of the legs 51, 52, forming one wall of the notches 56, extend laterally outwardly a distance slightly greater than the width of the legs 51, 52 so that the outer edge 61 of the lugs 60 are spaced a greater distance from the longitudinal axis of the keeper than the side edges 57 of the legs 51, 52. The outer corners of the lugs 60 of each keeper 50 are cut on a bias or at an angle across the corners of the legs to form a cam surface 62 in such a manner that the edge of each cam surface nearest to the longitudinal axis of the keeper 50 is disposed in substantial alignment with one edge 34 of the support members 31 or 32 when the keeper 50 is in assembled position on the blade as shown in Figure 7. The side edge 57 of each leg 51, 52 is cut at a bias to produce a ramp 63 into the one side wall of the notch 56 so as to provide a tapered entry into or out of the notches 56.

With the flexors or support members 31, 32 nested in the grooves 23, 24 one of the keepers 50 is threaded onto the end of the rubber wiper element 11 so that the legs 51, 52 of the keeper will straddle the undercut portion 22 of the web 20. The legs 51, 52 of the keeper 50 are superimposed on top of the support members 31, 32, respectively, and below the walls 27 of the grooves 23, 24 and are slid longitudinally of the support members 31, 32 until the detent portions 58 snap into the apertures 36 in the end portions of the members 31, 32. A similar assembly operation is performed on the other end portion of the rubber wiping element whereupon a complete wiper blade element or refill, shown in Figure 7, of a wiper blade assembly is produced. It will be noted that the support members 31, 32 when assembled in the grooves, Figure 3, will have a substantial part of the lower surfaces thereof spaced from the top face of the lower section 19 of the back portion 15.

The base 53 and struck portion 55 on the keeper 50 are adapted to be positioned substantially in contact with the extreme ends of the rubber wiping element to co-operate with and supplement the action of the detent portions 58 with the walls of the apertures 36 for holding the support members against excessive longitudinal displacement relative to the blade. The rubber wiper element with the assembled flexor means 12, as shown in Figure 7, is easily stored or shipped and is ready for use at any time.

To assemble the wiper element or refill of Figure 7 to the pressure-applying superstructure 13, it is necessary to remove one keeper 50 from the flexor means 12 whereupon the claws 42 of the secondary yokes of the superstructure are successively guided onto the support members 31, 32. The first pair of claws 42 guided onto the flexor means 12 will engage the cam surfaces 62 on the keeper 50 and will force the legs 51, 52 inwardly against the resiliency of the rubber until said claws 42 clear the ends of the legs 51, 52 whereupon further movement of the yoke relative to the wiper element will drop said claws 42 into the notches 56 in the legs 51, 52.

Continued movement of the superstructure 13 along the wiper element will cause the first pair of claws 42 that are seated in the notches 56 to be forced up the ramps 63 in the legs 51, 52 to a point where a portion of both the keeper legs 51, 52 and support members 31, 32 are contained within the embrace of the first pair of claws 42. The first pair of claws 42 and associated superstructure 13 are moved along the longitudinal axis of the wiper element in overlapping relation with the keeper means 50 a distance sufficient to permit the second keeper means 50 to be assembled with the end portion of the blade in operative position relative to the end portions of the support members 31, 32. With the second keeper means 50 assembled on the wiper element, the superstructure 13 is moved along the wiper element in the direction of said second keeper means 50. The claws 42 nearest the second keeper means 50 will engage with and ride up the cam surfaces 62 on the keeper means so as to depress the end portions of the legs 51, 52 into the rubber of the squeegee. After said claws 42 clear the side edges 61 of the lugs 60 the claws 42 will drop into nested relationship with the notches 56 in the keeper means 50. At the same time the claws 42 on the other extreme end of the superstructure 13 will disengage from the embracing relationship with the overlapped portion of the legs 51, 52 and support members 31, 32 of the keeper 50 and will drop into nested relationship in the notches 56 formed in said keeper 50. Whereupon the superstructure 13 is assembled in embracing relationship with the support members 31, 32 of the wiper element.

The claws, as best shown in Figure 3, engage around the edge 34 of the support members 31, 32 so as to permit relatively free movement between the yokes 38, 39 and the flexor means 12 in the plane substantially perpendicular to the surface being wiped. The notches 56 in the keeper 50 are slightly larger in a longitudinal direction than the claws 42 so as to permit a certain amount of longitudinal movement between the superstructure and the wiping element. The abovedescribed movement of the wiping element relative to the superstructure permits the blade assembly to be freely flexible so as to accommodate the wiping edge of the blade to the surface being wiped.

For removing the superstructure from the wiping element, the legs 51, 52 of one keeper 50 are pressed together against the resiliency of the rubber until the immediately adjacent claws 42 can be slipped over the lugs 60 as the superstructure is moved along the blade in a direction away from said keeper 50. The claws 42 on the other end of the superstructure will ride up the ramps 63 in the legs 51, 52 so that portions of the legs and supports will be nested together within said claws 42. The first-mentioned keeper 50 can then be removed from the end of the blade. The legs 51, 52 of the other keeper 50 are depressed against the rubber until the claws 42 on the other yoke can be slipped past the lugs 60 on the legs 51, 52 whereupon the whole superstructure is moved longitudinally of the blade in the direction of the end from which the keeper 50 was removed until the superstructur and blade are separated. A new wiping blade element or refill can then be installed as above described.

Having thus described my invention, it is obvious that various other modifications may be made in the same without departing from the spirit of my invention; hence, I do not wish to be understood as limiting myself to the exact forms, constructions, arrangements and combinations of parts herein shown and described.

I claim:

1. A wiper blade assembly comprising an elongate squeegee having a wiping edge portion and a backing portion, said backing portion being provided with oppositely facing grooves along the length thereof, resilient flexor means carried in each groove, keeper means straddling an end portion of the squeegee and being nested in said grooves in overlapping relation with said flexor means, means on said keeper means coacting with means on the end portions of said flexor means for holding said flexor means and said keeper means assembled on the squeegee, a pressure-distributing device having claws operatively engaging the edge portions of the flexor means for distributing pressure to the squeegee and means on said keeper means coacting with at least one selected claw of the pressure device for holding the pressure device from excessive longitudinal movement relative to the squeegee.

2. In a windshield wiper blade assembly and in combination, a resilient elongate wiping element having a wiping portion and a back portion and having at each of its sides two lineal portions each having a surface opposed to a surface of the other, said surfaces being spaced apart to form in each side of said element a groove lengthwise thereof, a freely and reversely resilient flexible lineal backing member disposed in substantial part in each of said grooves and having surfaces exposed a substantial distance outside of each groove, said surfaces being adapted to be slidingly engaged by a pressure assembly having spaced-apart portions constructed and arranged to distribute pressure to spaced-apart portions of said backing member, keeper means for holding said backing members in co-operative relationship with each other and against displacement from said grooves, and cam surfaces on said keeper means for forcing the respective sides of the keeper means together to allow the outer spaced-apart portions of the pressure assembly to move into operative position relative to the blade.

3. A wiper blade comprising an elongate squeegee having a wiping edge portion hinged to a backing portion, said backing portion having a pair of oppositely disposed grooves formed throughout substantially the full length thereof, resilient backing means seated in said grooves, keeper means straddling the center portion of the squeegee and being disposed in one end portion of the grooves in superimposed relationship with at least one end portion of the backing means, means on said keeper means coacting with means on said backing means for holding the backing means and keeper means assembled, and pressure-distributing means having spaced-apart portions engaging with the flexible backing means, at least one spaced-apart portion of the pressure-distributing means engaging between parts of said keeper means for limiting longitudinal movement of said pressure-distributing means relative to the blade.

4. A wiper blade comprising an elongate squeegee having a wiping edge portion hinged to a backing portion, said backing portion having a pair of oppositely disposed grooves formed throughout substantially the full length thereof, resilient backing means seated in each of said grooves, said backing means being apertured in the end portions thereof, U-shaped keeper means straddling the center portion of the squeegee and being inserted in the ends of the grooves in superimposed relationship with the end portions of the backing means, a detent formed in each leg of the keeper means for engaging in the apertures in the backing means for holding the backing means assembled on the squeegee, and pressure-distributing means having spaced-apart portions bearing on the flexible backing means, and a notch formed in at least one leg of said keeper means for receiving at least one of said portions of the pressure-distributing means for holding said pressure-distributing means on said blade.

5. In a wiper assembly comprising an elongate wiper blade having a resilient wiper element and elongate flexible supporting means therefor, keeper means operatively associated with said support means for holding said support means and said keeper means assembled, and a pressure-distributing device having claw means coacting with said support means for distributing pressure thereto at longitudinally spaced points, at least one of said claw means coacting with spaced parts of said keeper means for limiting excessive longitudinal movement of said pressure-distributing device relative to said support means.

6. In a wiper assembly comprising an elongate wiper blade having a resilient wiper element and a pair of elongate flexible supporting means therefor, keeper means operatively associated with said support means for holding said support means assembled with said wiper element, said keeper means comprising a substantially flat U-shaped body portion having notches formed in the opposite side edges of the legs thereof, the outward corner of the extremity of each leg having a tapered surface to provide a cam means thereon, and a pressure-distributing device having claw means coacting with said support means for distributing pressure thereto at longitudinally spaced points, at least one of said claw means sliding over said cam means for forcing the legs of the keeper means together to permit the claw means to move into operative position in the notches.

References Cited in the file of this patent

UNITED STATES PATENTS

| | | |
|---|---|---|
| 2,741,792 | Ehrlich | Apr. 17, 1956 |
| 2,782,446 | Krohm | Feb. 26, 1957 |
| 2,782,447 | Anderson | Feb. 26, 1957 |
| 2,782,448 | Anderson | Feb. 26, 1957 |

UNITED STATES PATENT OFFICE
CERTIFICATE OF CORRECTION

Patent No. 2,983,945                           May 16, 1961

William G. De Pew

It is hereby certified that error appears in the above numbered patent requiring correction and that the said Letters Patent should read as corrected below.

Column 6, line 34, strike out "and"; same column, line 75, for "2,782,448" read -- 2,782,449 --.

Signed and sealed this 20th day of November 1962.

(SEAL)
Attest:

ERNEST W. SWIDER
Attesting Officer

DAVID L. LADD
Commissioner of Patents